United States Patent [19]

Volk, Jr. et al.

[11] Patent Number: 5,328,015
[45] Date of Patent: Jul. 12, 1994

[54] AUGER ASSEMBLY FOR FEED BIN

[76] Inventors: Joseph A. Volk, Jr., 380 Hackmann, Creve Coeur, Mo. 63141; James B. Hickman, Route 1, Box 151F, Carrollton, Ala. 35447

[21] Appl. No.: 698,308
[22] Filed: May 10, 1991
[51] Int. Cl.⁵ .................... B65G 33/00; B65G 13/02
[52] U.S. Cl. .................... 198/548; 198/550.1; 198/672; 198/674
[58] Field of Search ............ 198/548, 550.1, 674, 198/672, 659, 657

[56] References Cited

U.S. PATENT DOCUMENTS

| 3,602,552 | 8/1971 | Morgan | 198/672 X |
| 3,726,392 | 4/1973 | Rastoin | 198/659 |
| 3,756,372 | 9/1973 | Mertens | 198/550.1 X |
| 4,220,242 | 9/1980 | Forsberg | 198/672 X |
| 4,256,217 | 3/1981 | Mathias | 198/548 X |
| 4,275,808 | 6/1981 | Bullivant et al. | 198/662 X |
| 4,365,707 | 12/1982 | Kemp, Jr. | 198/672 |

FOREIGN PATENT DOCUMENTS

| 1960605 | 5/1971 | Fed. Rep. of Germany | 198/674 |
| 3441409 | 5/1986 | Fed. Rep. of Germany | 198/550.1 |

Primary Examiner—Cheryl L. Gastineau

[57] ABSTRACT

An improved auger design comprises a one-piece assembly with bearings at both the inboard and outboard ends of the auger flight to self-support the auger flight within a discharge tube of the feed bin. Furthermore, a single mounting plate secures the auger to the discharge tube such that a small number of bolts may be removed to thereby facilitate the ready insertion or removal of the auger from within the discharge tube to aid in its cleanability and maintenance or replacement of failed parts.

14 Claims, 2 Drawing Sheets

AUGER ASSEMBLY FOR FEED BIN

BACKGROUND AND SUMMARY OF THE INVENTION

In the prior art, there are various arrangements for slowly metering out dry material held in bulk form in feed bins. One of the more common devices used for this purpose is an auger. Typically, the feed bin includes a generally rectangular compartment which tapers downwardly in a V-like cross-sectional shape into a discharge tube or other arrangement for containing an auger. Thus, the auger flight is exposed to the dry material in the bin along the top of the discharge tube and at the apex of the V such that the auger flight captures the dry material and, as the auger drive motor is operated, conveys the dry material to the end of the discharge tube where it exits therefrom in a discharge opening into a hopper of some sort. In a batch weighing device commonly used in the prior art, a weigh hopper is mounted beneath the discharge tube opening, and one or more banks of feed bins and augers are mounted on either side thereof for conveniently conveying different quantities of different materials into the weigh hopper as required to make up a batch of material for use in a process.

In the prior art, there are many arrangements for these augers including their drive motors. However, for the most part, and as best known to the inventor herein, little attention has been paid to the problem of removing the auger from the discharge tube in order to clean out the feed bin. Still another problem typically experienced in the prior art is that the auger flight, which extends in cantilever fashion from the drive motor, is typically permitted to rest directly on the bottom of the discharge tube so that the auger flight invariably has a tendency to scrape or shave metal filings away from the bottom of the discharge tube. This problem results from the auger flight not being supported at both its inboard and outboard end by a suitable bearing so as to center the auger flight within the discharge tube and prevent its overhung weight from loading the outboard end of the auger flight. Furthermore, not only will the weight and loading of the auger flight contribute to this problem, but the mere fact that the auger flight is permitted to "float" within the discharge tube results in eventual wearing of the discharge tube and increased problems in this regard. While many of these feed bins and auger drives are utilized in processes where generally de minimis amounts of metal filings and shavings do not appreciably detract from the results of the process, there are some applications which require higher standards of cleanliness, purity and the like such as in processes where food stuffs are the end result thereof. These applications require not only that the metal filings and shavings typically experienced in the prior art devices be eliminated, but also require that the feed mill and auger drive be arranged to meet the FDA standards of cleanability and the like on a regular on-going basis. This requires virtually complete disassembly and separation of the auger from the feed mill and complete access to the discharge tube for flushing. Therefore, in these applications, the auger and feed bin arrangement must be suitable for rapid disassembly and reassembly but also provide for adequate support for the auger flight both at its inboard and outboard end. The inventor is aware of no arrangements for augers and feed bins which are particularly directed and adapted to this problem.

In order to solve these and other problems in the prior art, the inventor herein has succeeded in designing and developing an auger which not only provides both inboard and outboard bearing support for its auger flight as mounted in the discharge tube, but also may be removed by quickly disassembling a mounting plate and flange secured with a few bolts. The auger flight, which extends through the discharge tube, may then be quickly and conveniently removed and/or reinserted from the discharge tube. Furthermore, by providing a notch-like discharge opening which is spaced inwardly from the edge of the discharge tube, a lip is formed which may be used to support a bearing rotatably mounted to the end of the shaft which supports the auger flight. Thusly, the outboard end of the auger flight is conveniently supported by a bearing which eliminates the problem of metal shavings contaminating the material being processed through the auger. The mounting plate and flange may be conveniently located at the outboard end of the discharge tube such that it is readily accessible by maintenance personnel. This is especially an advantage where a plurality of feed bins and augers are rack mounted along a batch weighing device or the like such that a maintenance man may step from one feed bin to the next and with a socket wrench or the like quickly and easily remove the four or so bolts which mount the auger assembly to the feed bin and then slide the auger flight out of the discharge tube. In this manner, all of the augers may be conveniently removed from the feed bins of a batch weighing device or the like such that the entire device may be washed down in one process. Thereafter, all of the augers may then be quickly and conveniently reassembled to the feed bins in a minimal amount of time.

As explained above, an outboard bearing assembly may be rotatably mounted to the end of the shaft which carries the auger flight. This bearing assembly may be made of a self-lubricating plastic which is relatively inexpensive and yet which facilitates the insertion or removal of the bearing from within the discharge tube. As can be appreciated, the bracket is generally annular in shape and must be pushed or pulled through the discharge tube in an axial direction which might otherwise have a tendency to cant the bearing, leading to jamming and potentially damage to the bearing, shaft, or discharge tube. By utilizing a self-lubricating plastic material as is well known in the art, these difficulties are eliminates and a smooth insertion and/or removal of the bearing may be readily achieved.

The modular nature of the auger assembly also renders it convenient for troubleshooting and/or maintenance with minimal down time to the batch weighing device. As can be appreciated, a batch weighing apparatus typically represents a significant capital expenditure and, perhaps more importantly, is often an integral portion of an on-line process. Therefore, if a particular auger drive, auger flight, bearing, or some other component of the auger fails or otherwise requires maintenance, the inventor's design provides for a quick and convenient way to replace the entire auger and thereby eliminate whatever problem existed in the auger which may have led to a malfunction. Furthermore, the different components comprising the auger, i.e. the drive motor, coupling, bearings, and auger flight, are all readily replaceable with minimal disassembly such that a minimal amount of spare parts are required to support the multiple number of augers typically found in a single batch weighing apparatus, Therefore, the modular design of the present invention also provides increased advantages and convenience over the prior art for these reasons as well.

While the principal advantages and features of the present invention have been described above, a more complete and thorough understanding of the invention may be attained by referring to the drawings and description of the preferred embodiment which follow.

DETAILED DESCRIPTION OF THE PREFERRED EMBODIMENT

Figure 1:
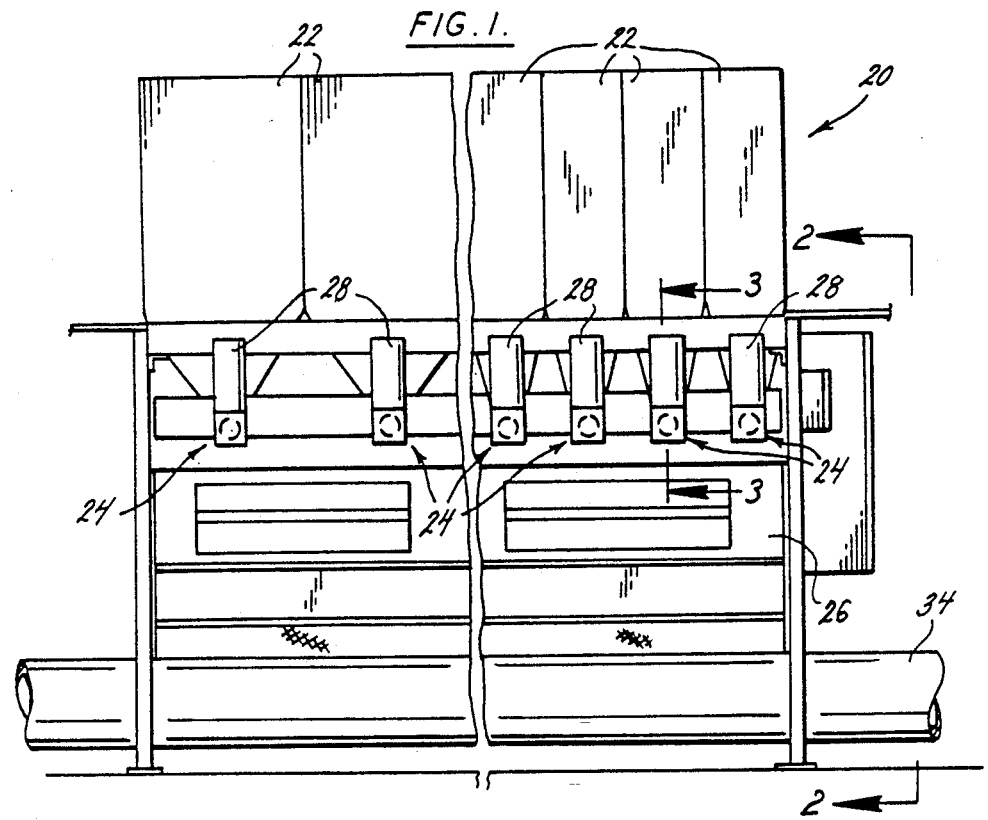
FIG. 1 is a side view of a batch weighing device which includes a rack of feed bins and auger assemblies of the present invention.
Figure 2:
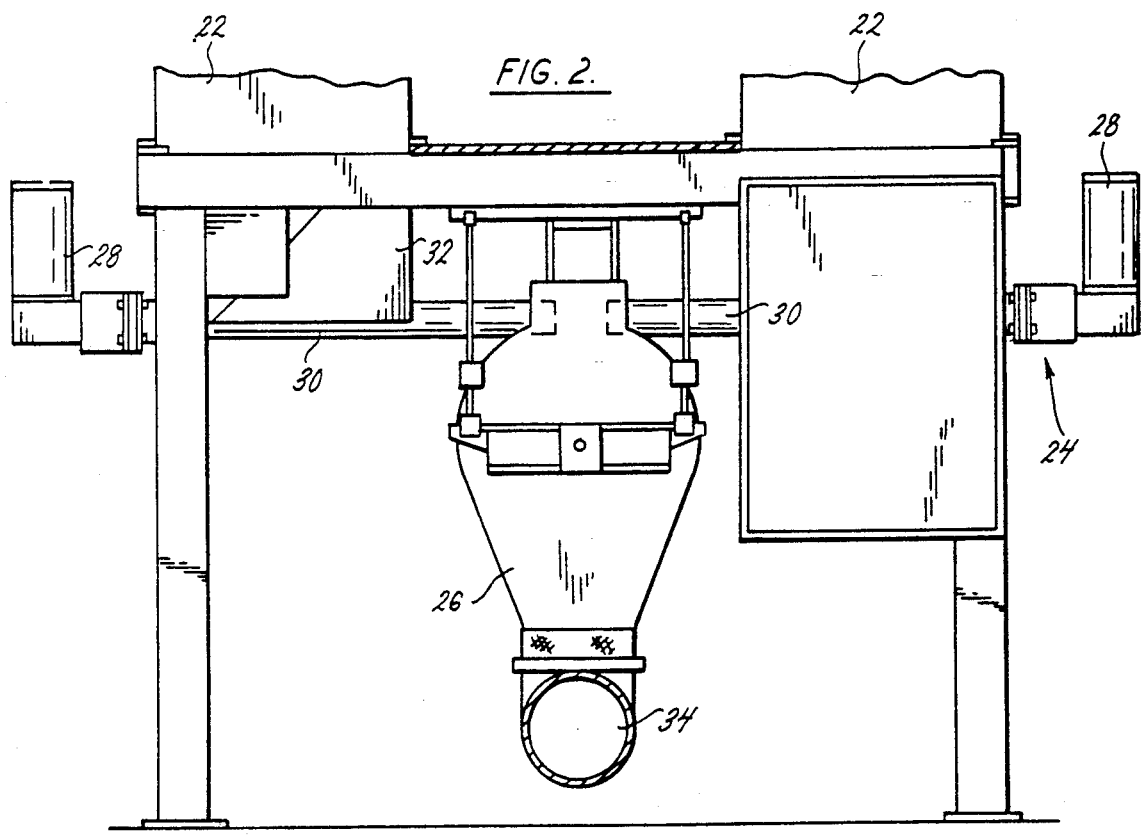
FIG. 2 is a side view of the batch weighing device shown in FIG. 1 with further detail of the discharge tubes and cantilever mounted augers of the end feed bins and a weigh hopper for collecting material fed from the feed bins.

As shown in FIG. 1, a batch weighing device 20 typically includes a plurality of feed bins 22 each of which has a motor driven auger 24 for controllably conveying dry material contained in bulk form in feed bin 22 into a weigh hopper 26 slung underneath the feed bins 22. This is perhaps shown more graphically in FIG. 2 where the augers 24 for each feed bin 22 include a drive motor 28 exposed outboard of the feed bin 22 and with the discharge tube 30 formed at the apex of a V-shaped trough 32 at the bottom of each feed bin 22, the discharge tube extending inboard so that it may feed material exiting the feed bin 22 into the weigh hopper 26 at its inboard end. Thusly, under automatic control or operator control a selected amount of a selected ingredient from any of the feed bins 22 may be reliably and accurately metered into the weigh hopper 26 to create a batch of materials suitable for conveying with a vacuum conveyor or the like through a conveyor line 34 to other apparatus for further batch processing.

Figure 3:
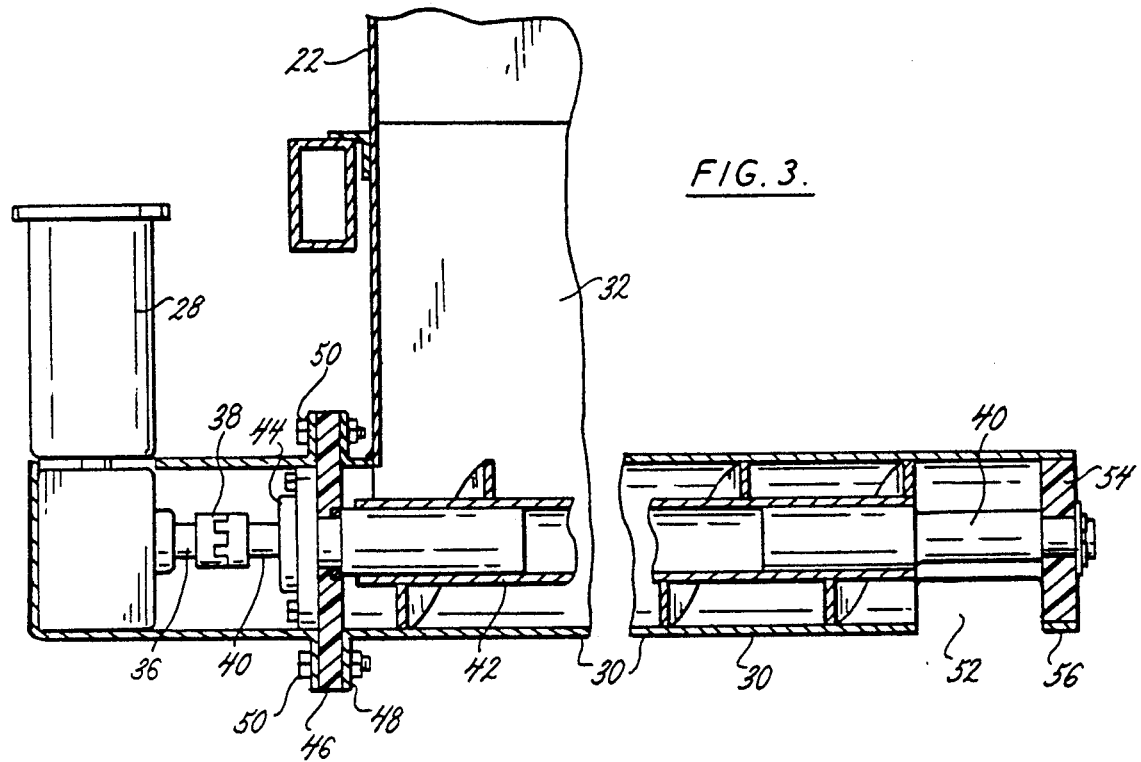
FIG. 3 is a partial cross-sectional view taken along the plane of line 3—3 in FIG. 1 detailing the auger mounted to and extending through the discharge tube of a feed mill.
Figure 4:
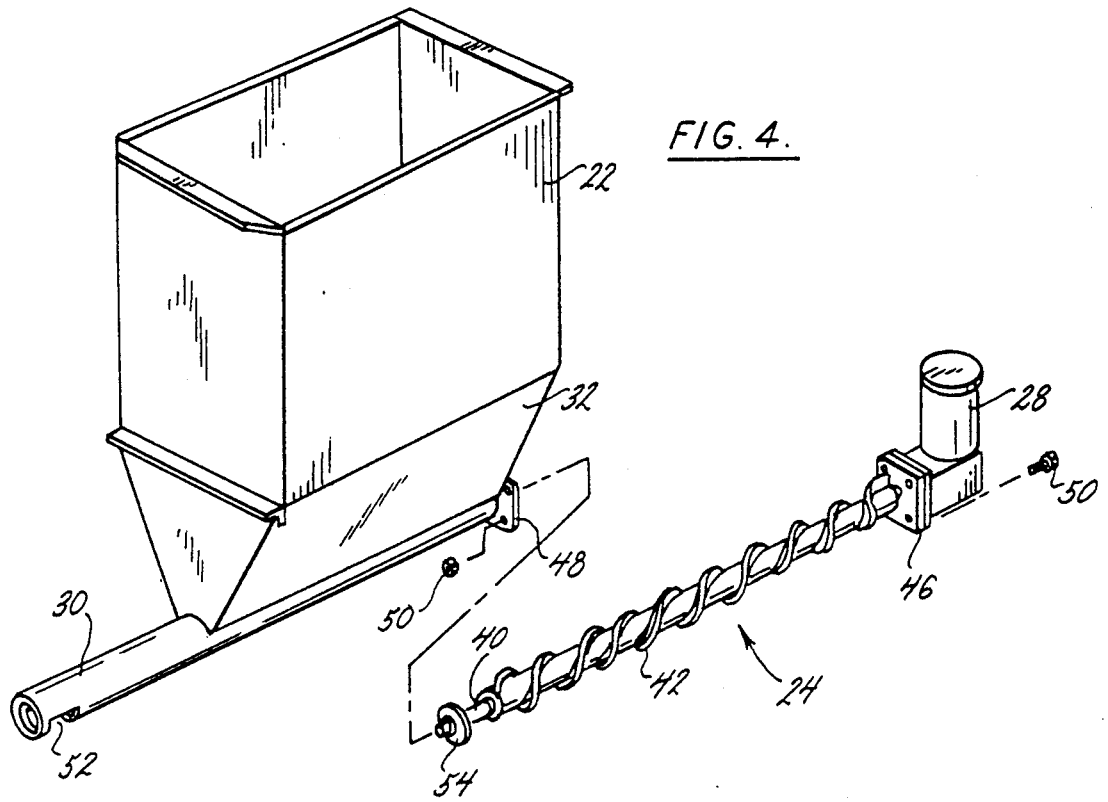
FIG. 4 is an exploded view of an auger and feed bin depicting it in disassembly.

As shown in FIGS. 3 and 4, the auger 24 includes the drive motor 28 as previously mentioned with an output shaft 36 driving a coupling 38 to which is secured a drive shaft 40 for the auger flight 42. An outboard bearing 44 supports the auger shaft 40 and auger flight 42 at its inboard end. A mounting flange 46 is coupled to a mounting plate 48 by a plurality of bolts 50 or the like and serve to secure the auger 24 to the discharge tube 30. The discharge tube 30 has a discharge opening 52 at its inboard end through which the material exits into the weigh hopper 26, as explained above. At the very inboard end of the auger flight shaft 40 a self-lubricating bearing 54 is rotatably secured thereto and is supported by the lip 56 of discharge tube 30 at its very inboard end. The self-lubricating bearing 54 may be a generally annularly shaped disk of self-lubricating plastic or the like to facilitate its insertion and removal through the length of discharge tube 30.

In operation, auger 24 may be readily removed and/or reinstalled within discharge tube 30 by merely loosening (or tightening) bolt 50 and sliding auger flight 42 through discharge tube 30 such that inboard bearing 54 is suitably situated within lip 56 of discharge tube 30. Furthermore, the individual components of the auger 24 may be readily disassembled as drive motor 28 is coupled by coupling 38 to the drive shaft 40 of auger flight 42. Similarly, inboard bearing 54 may be readily disassembled by removing the C-ring retainer or the like used to retain bearing 54 on auger flight shaft 40. Thus, all of the major components of auger 24 may be readily replaced in order to facilitate the repair thereof. Furthermore, an individual auger 24 may be removed and replaced in its entirety in order to bring the batch weighing apparatus 20 to an up and running condition and to prevent equipment down time.

Still another advantage and feature of the present invention as shown in the figures and explained herein is the complete removal of the auger 24 from within discharge tube 30 to thereby expose entirely all of the passageways utilized in conveying dry material from bin 22 into weigh hopper 26. Thusly, bin 22 including trough 32 and discharge tube 30 may be readily flushed with water without fear of damage, contamination, or other interference from auger 24.

Still another advantage evidenced in the present invention is the fact that both ends of auger flight 24 and auger flight drive shaft 40 are supported by bearings 44, 54 such that there is virtually no tendency of the auger flight 42 to shave metal from the inner wall of discharge tube 30 such that it would later inadvertently appear in the weigh hopper 26 and thus be included as part of the batch of material further processed by other equipment. For those processes requiring elimination of these metal shavings as might be experienced in prior art designs with cantilevered auger flights, the present invention provides that advantage. Furthermore, reduced wear on the inner wall of discharge tube 30 may be experienced by close spacing of the auger flight 42 with the dimensions of discharge tube 30. This closer spacing also provides more accurate operation and less tendency of the material to clog discharge tube 30 and also ensure a complete conveying of material with less build-up within discharge tube 30. Any perishable foodstuff ingredients or the like which would otherwise tend to build up in discharge tube 30 could encourage the growth of bacteria or other contaminants which could have a deleterious effect on the batch process by contaminating the batch material itself as it is "made up" in weigh hopper 26.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A feed bin for holding a quantity of dry material in bulk form, said feed bin having a generally horizontally oriented discharge tube extending inwardly therefrom to dump its contents through a discharge opening and into a hopper therefor, and an auger including an auger flight extending through said discharge tube and in communication with the interior of said feed bin for controllably feeding said dry material out of said feed bin, through said discharge tube, and out of said discharge opening, said auger including a drive motor, and an end bearing mounted to said auger flight at said end opposite said drive motor, said auger thereby being one assembly comprised of said drive motor, auger flight, and end bearing adapted for insertion through said discharge tube, and means for mounting said auger to said discharge tube so that said auger assembly may be readily installed or removed as a one-piece assembly from said discharge tube.

2. The device of claim 1 wherein said auger mounting means comprises a mounting plate on an end of said discharge tube, a matching mounting flange on said auger and a plurality of bolts or the like to secure said flange to said plate.

3. The device of claim 2 wherein said discharge opening comprises a notch spaced from the inboard end of said discharge tube and generally in the bottom thereof so that as dry material reaches said discharge opening, gravity tends to cause said dry material to exit from said discharge tube.

4. The device of claim 3 wherein said end bearing is received and supported by that portion of said discharge tube inboard of said discharge opening.

5. The device of claim 4 wherein said auger further comprises a coupler between said drive motor and said auger flight, and a support bearing positioned near the outboard end of said flight so that said flight is supported by bearings at both ends thereof.

6. The device of claim 5 wherein said flight is sized to closely sweep the interior of said discharge tube.

7. In a feed bin for containing a quantity of dry material in bulk, said feed bin having a generally horizontally extending discharge tube through which said dry material may be dispensed, the improvement comprising an auger mounted within said discharge tube, said auger comprising a single assembly including a drive motor, an auger flight connected to said drive motor, and a bearing mounted to an end of said auger flight opposite said drive motor, and means for removably mounting said auger to said discharge tube, said auger mounting means being located near said drive motor end of said auger so that said auger mounting means may be released and said auger removed as a one-piece assembly from said discharge tube.

8. The device of claim 7 wherein said auger further comprises a bearing mounting an end of said auger flight adjacent said drive motor, both of said bearings thereby supporting said auger flight within said discharge tube.

9. The device of claim 8 wherein said auger mounting means comprises means for securing said auger at only one end of said discharge tube.

10. The device of claim 9 wherein said auger mounting means comprises a mounting plate on said feed bin near one end of said discharge tube and a matching mounting flange on said auger, and a plurality of bolts to secure said plate to said flange.

11. The device of claim 10 wherein said mounting plate is situated on an end of said discharge tube and said mounting flange is situated near the drive motor.

12. In a feed bin apparatus for containing a quantity of dry material in bulk, said feed bin apparatus having a plurality of generally horizontally extending discharge tubes through which said dry material may be dispensed into a common weigh hopper, the improvement comprising an auger mounted within each of said discharge tubes, each of said augers comprising a single assembly including a drive motor, the drive motor end of each of said augers being mounted on the outboard end of said discharge tubes, an auger flight connected to said drive motor, bearings mounted adjacent either end of said auger flight to thereby support said auger flight within said discharge tube, and means for mounting said auger to said discharge tube, said auger mounting means comprising a mounting plate on said feed bin apparatus and a matching mounting flange on said auger, and a plurality of bolts to secure said plate to said auger, said auger mounting means being located near said drive motor end of said auger so that said auger may be readily inserted or removed from said discharge tube by releasing said mounting means.

13. The device of claim 12 wherein each of said discharge tubes includes a discharge opening comprising a notch spaced from the inboard end of said discharge tube and generally in the bottom thereof so that as dry material reaches said discharge opening, gravity tends to cause said dry material to exit from said discharge tube.

14. The device of claim 13 further comprising an end bearing for supporting the inboard end of each of said auger flights, said end bearings being received and supported by those portions of said discharge tubes inboard of said discharge openings.

* * * * *